US007165307B2

(12) United States Patent
Tojo et al.

(10) Patent No.: US 7,165,307 B2
(45) Date of Patent: *Jan. 23, 2007

(54) METHOD AND MACHINE FOR FORMING PROTECTIVE FILM ON SPRAYED COATING OF LARGE-SIZED PRODUCT

(75) Inventors: Hideaki Tojo, Saitama-ken (JP); Hideo Ishida, Saitama-ken (JP); Hisashi Kurota, Saitama-ken (JP); Takao Arasawa, Saitama-ken (JP); Nobuyuki Okita, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/627,270

(22) Filed: Apr. 4, 1996

(65) Prior Publication Data

US 2003/0163910 A1 Sep. 4, 2003

Related U.S. Application Data

(62) Division of application No. 08/398,881, filed on Mar. 6, 1995, now Pat. No. 7,097,876.

(51) Int. Cl.
*B23P 25/00* (2006.01)

(52) U.S. Cl. .......................... 29/458; 29/424; 427/154; 427/156

(58) Field of Classification Search .................. 29/458, 29/424; 427/154, 155, 156
See application file for complete search history.

(56) References Cited

U.S. PATENT DOCUMENTS 4,727,232 A * 2/1988 Omori et al. .............. 219/91.2
4,907,533 A * 3/1990 Nelson et al. .............. 118/663
5,061,518 A * 10/1991 Langerbeins et al. ....... 427/154
5,143,949 A * 9/1992 Grogan et al. .............. 523/334
5,186,978 A * 2/1993 Woodhall et al. ........... 427/154
5,281,436 A * 1/1994 Swidler ....................... 427/156
5,411,760 A 5/1995 Woodhall et al.
5,428,880 A * 7/1995 Tomioka et al. .............. 29/458

(Continued)

FOREIGN PATENT DOCUMENTS

JP 441410 4/1992

*Primary Examiner*—Marc Jimenez
(74) *Attorney, Agent, or Firm*—Carrier, Blackman & Associates, P.C.; Joseph P. Carrier; William D. Blackman

(57) ABSTRACT

There are disclosed a method and apparatus for applying a strippable paint to a large-sized product finished with a sprayed coating, such as an automobile, to form a protective film on the surface of the coating. The product is conventionally kept in stock for a period of time before it is shipped. Contaminations such as dust are washed away from the surface of the product. Then, the strippable paint is applied, preliminarily dried, and non-preliminarily dried to form the protective film out of the strippable paint on the surface of the coating. This protective film is formed easily, appropriately, and reliably. The obtained protective film has a uniform and sufficient thickness. Even if the surface contains unapplied regions to which the paint should not be applied, the paint can be applied to the whole surface of the coating while avoiding the unapplied regions according to the invention. The application can be performed easily and reliably without leaving unapplied portions around the unapplied regions.

14 Claims, 6 Drawing Sheets

U.S. PATENT DOCUMENTS

| | | | | |
|---|---|---|---|---|
| 5,494,702 | A * | 2/1996 | Blaine et al. | 427/154 |
| 5,542,699 | A * | 8/1996 | Verdick | 29/458 X |
| 5,604,282 | A * | 2/1997 | Grogan et al. | 524/232 |

* cited by examiner

METHOD AND MACHINE FOR FORMING PROTECTIVE FILM ON SPRAYED COATING OF LARGE-SIZED PRODUCT

The present application is a divisional application of application Ser. No. 08/398,881, filed Mar. 6, 1995 now U.S. Pat. No. 7,097,876.

BACKGROUND OF THE INVENTION

1. Field of the Invention

The present invention relates to a method of spraying a strippable liquid paint on the surface of a large-sized product finished with a sprayed coating, such as an automobile, to form a protective film. Also, the invention relates to a machine for implementing this method and to a method of forming this protective film in such a way that those portions of the product which need no protective film are not sprayed with the paint.

2. Description of the Related Art

Typically after an automobile is assembled, it is initially kept in stock. Before it is shipped. Therefore, a long interval passes until the vehicle is shipped. For this reason, dust or the like adheres to the surface of the sprayed coating on the outside of the automobile. In order to prevent this adhesion of dust, it has been attempted to form a protective film on the surface of the sprayed coating of the automobile. In the past, this formation of the protective film has been carried out by applying a liquid, rust preventive wax to the automobile's surface, which would be removed when the automobile reached its shipping destination.

In recent years, techniques for alleviating the burden imposed by a wax-removing operation performed at the destination or for environmental protection has been disclosed, for example in Japanese Patent Laid-Open No. 267171/1991. In particular, a plastic film having a removable pressure-sensitive adhesive is pressed against the surface of an assembled automobile finished with a sprayed coating, using a vacuum. Thus, the body surface is coated with this plastic film. In this way, the coating surface of the finished automobile is temporarily protected.

With respect to small parts, a strippable paint has been sprayed on them to form a protective film.

In the above-described known method consisting of coating the body surface with a plastic film, the whole surface of the automobile is covered with the protective film. Therefore, the protective film is stuck even on those portions which are not required to be protected such as the windshield. This leads to a cost increase.

Where a strippable paint is employed, it is possible to protect only desired portions. However, if the sprayed object is large such as an automobile, the protective film lacks uniformity because of nonuniform drying, the film is damaged by matter adhering to the surface of the coating, or other problems take place.

Where a strippable paint is applied to the surface of the coating of a finished automobile in an attempt to form a protective film for the coating, dust or the like often adheres to the surface of the coating. Also, dirty water may adhere to the surface. Furthermore, it may be wetted with rainwater or the like. In these situations, appropriate and smooth formation of the protective film is hindered when a strippable paint is applied. Moreover, the temperature of the surface of the coating drops. This makes it difficult to form a protective film on the surface of the coating.

Where a strippable paint is applied, the fringes of a region to be applied with the paint are applied with the paint, using a brush or a roller. Then, the paint is sprayed against the inner applied region surrounded by the fringes. In this way, a masking operation is dispensed with.

However, in some cases, components which are not required to be sprayed with paint such as windshield washer nozzles are located around the center of the region to which a strippable paint is applied. The washer nozzles are holes for ejecting cleaning liquid toward the windshield. In these cases, if the paint is sprayed against the hood after the paint has been applied to the fringes of the washer nozzles with a brush or nozzle, it is considerably difficult to perform the spraying operation in such a way that the paint does not adhere to the washer nozzles. Moreover, the strippable paint may be directly applied to the entrances to the windshield washer nozzles or enter the nozzles. Furthermore, dust of the paint may enter the nozzles. As a result, a film of the paint is formed at the entrances to the nozzles or even inside the nozzles. Hence, extra steps must be carried out to remove the film.

Where the roof of an automotive body may be opened such as a sliding roof, a conceivable paint application method consists of first applying the paint to the vicinities of the opening in the roof and to the vicinities of the engaging portion of the roof with a brush or roller and then spraying the paint against the remaining desired portions. However, a sealing member made of rubber is mounted around the opening in the roof and acts as a seal when the sliding roof is in a closed state. Therefore, there is the possibility that dust of the strippable paint enters the gap between the rubber seal and the sliding roof.

Side turning lights which are mounted to right and left fenders, respectively, on an automotive body via rubber seals have similar drawbacks. Therefore, a procedure for removing the protective film of a strippable paint is inevitable once the automobile reaches the destination. This procedure involves numerous steps.

SUMMARY OF THE INVENTION

The present invention has been made to solve these various problems of the related art.

A first embodiment of the present invention resides in a method of forming a protective film on the surface of a large-sized product finished with a sprayed coating, such as an automotive body, by applying a strippable paint to the product. Before the strippable paint is applied to the product, contaminations on the coating surface such as dust and dirt due to rainwater are removed as a pretreatment step. This pretreatment step consists of a washing step using warm water and a dehydrating step using blown hot air.

In this pretreatment step, contamination, such as dust, dirty water, and rainwater, adhering to the surface of the sprayed coating on an automotive body on which a protective film is to be formed are removed. This assures that a strippable paint will be smoothly and effectively applied to the coating surface on the automotive body.

In a second embodiment of the invention, the step of applying a strippable paint to a large-sized product finished with a sprayed coating, such as an automotive body to form a protective film on the surface of the coating comprises steps of applying the strippable paint to the product, preliminarily drying the product to which the paint has been applied, and then non-preliminarily drying the product. In this way, the protective film is formed on the surface of the sprayed coating of the product. The temperature at which the non-preliminary drying is effected is preferably 60 to 90° C.

In the second embodiment of the invention, it is assured that a uniform protective film is formed on the surface of a large-sized product finished with a sprayed coating, such as an automotive body, by applying and drying the strippable paint.

In a third embodiment of the invention, a paint application apparatus for forming the protective film of the strippable paint in the second embodiment described above is provided to carry out the method for applying the paint. The apparatus comprises a booth for applying the paint to the sprayed product, a preliminary drying furnace for preliminarily drying the strippable paint applied to the sprayed product, and a non-preliminarily drying furnace for non-preliminarily drying the product preliminarily dried. The preliminary drying furnace uses an infrared drying furnace. A hot air drying furnace is employed as the non-preliminary drying furnace.

In a fourth embodiment of the invention, a method for spraying a strippable paint on a large-sized product finished with a sprayed coating, such as an automobile, and equipped with holes for ejecting liquid near the center of the outer sprayed coating surface of the body and/or with parts in which the airtightness is enhanced by sealing members such as rubber seals, consists of masking a range considerably wider than the applied region containing the ejecting holes and/or the parts with enhanced airtightness, spraying the strippable paint on the product, removing the masking materials, and amending the paint around the holes and/or the parts with enhanced airtightness. In this way, a protective film is formed by spraying the strippable paint.

In the fourth embodiment of the invention, the strippable paint for protecting the sprayed coating on a large-sized product such as an automotive body is applied to the product to form a protective film. At this time, the paint is not sprayed on those components to which the strippable paint is not required to be applied, such as sealing members for windshield washer nozzles, the sealing member for the opening in the sliding roof, and components such as side lights. As a result, a cumbersome operation of removing the protective film, which would normally be needed in conventional methods because the strippable paint and its dust erroneously adheres to the above-described components, is made unnecessary.

The present invention also provides a method and apparatus for forming a protective film on the surface of the sprayed coating of a large-sized product such as an automotive body by applying a strippable paint, based on a combination of the methods of the aforementioned first and second embodiments. The combination method consists of performing a pretreatment step for removing contaminations from the surface of the coating prior to formation of the protective film on the product, then applying the strippable paint to the pretreated product, preliminarily drying the product to which the paint has been applied, and non-preliminarily drying the preliminarily dried product, thus forming the protective film on the surface of the sprayed product.

The invention also includes an automobile assembly method including a strippable paint coating step, the assembly method comprising a pressing step of forming panel parts by plastic working thin sheet steel, a welding step of forming an automobile body by welding the panel parts together, a painting step of painting the surface of this automobile body, a subsequent assembly step of mounting an engine and functional parts and the like on the body, anti-scratch cover fitting and removal steps disposed before and after the assembly step, a strippable paint coating step of coating the painted surface of the finished automobile assembled in the assembly step with a strippable paint, and a final inspection step.

By interposing a strippable paint coating step between the above-mentioned painting and assembly steps so that the engine and functional parts and the like are assembled after a protective film is formed, the above-mentioned anti-scratch cover fitting and removal steps can be made unnecessary.

With this kind of method, compared to a case where strippable paint coating is carried out after the automobile is finished as has been the norm, the adhesion of dust and the like occurring in the assembly step, or in the assembly step and the inspection step, can be prevented, and the amount of equipment required and the number of manufacturing steps involved can be reduced and cost reductions achieved.

Other objects and features of the invention will appear in the course of the description thereof, which follows.

DETAILED DESCRIPTION OF THE PREFERRED EMBODIMENTS

Figure 1:
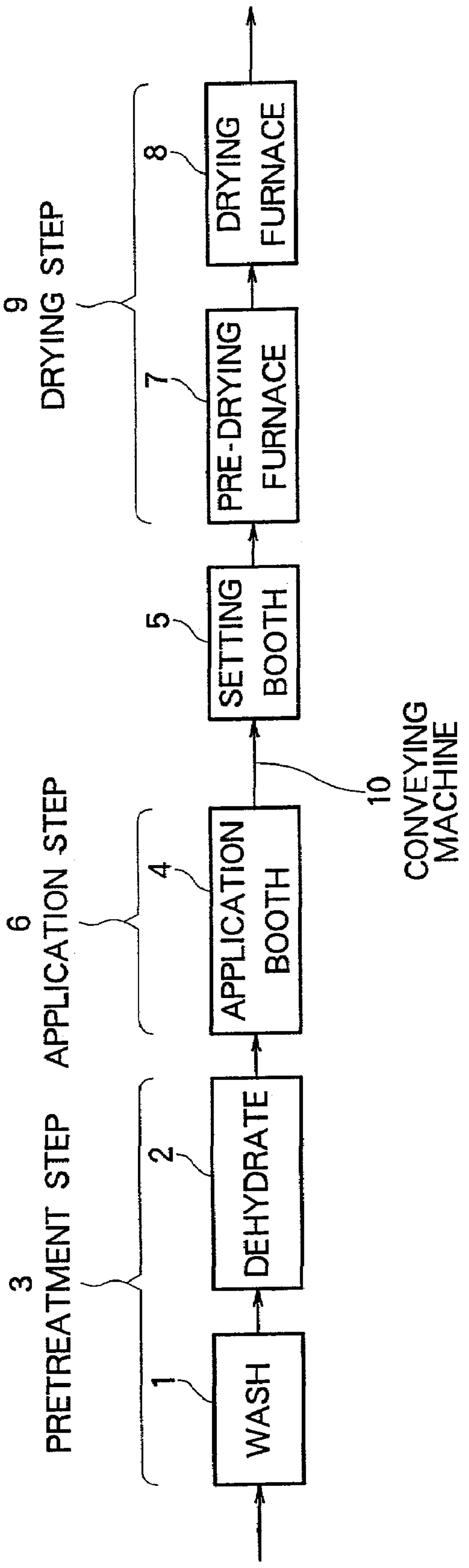
FIG. 1 is a block diagram of illustrating successive steps of a method of forming a protective film on the surface of a large-sized product finished with a sprayed coating by applying a strippable paint according to the present invention, the successive steps containing a pretreatment step consisting of a washing step using warm water and a dehydrating step using hot air, an application step consisting of applying the strippable paint for forming the protective film and a subsequent drying step consisting of multiple drying stages.

The preferred embodiments of the present invention are hereinafter described in detail by referring to the accompanying drawings. FIG. 1 illustrates successive steps for carrying out application of a strippable paint to form a protective film on a large-sized product finished with a sprayed coating, according to a preferred embodiment of the invention. The successive steps contain a step (pretreatment) carried out prior to application of the strippable paint and the subsequent steps of applying the strippable paint and drying the strippable paint.

In the illustrate a example, the product having the sprayed coating to which the strippable paint is applied so as to form the protective film is an automobile. The body of this automobile is finished with a sprayed coating. Various appliances and components are incorporated in the body, thus producing a finished automobile. Then, the automobile is kept in stock and shipped. Emphasis is placed on the coating of the automobile for the sake of appearance, and the automobile is a large-sized product.

Before the automobile is shipped in this way, a strippable paint is applied to the surface of the coating of the body to form a protective film.

The successive steps are next described by referring to FIG. 1. The preferred first embodiment of the invention is described now. The automobile once manufactured and kept in stock and will be shipped. Contaminations such as dust, dirty water, water such as rainwater adhere to the surface of the sprayed coating of the automobile. To form the protective film on this surface of the coating, the strippable paint is applied to the surface. Before the application of this paint, a pretreatment step is carried out. That is, it is necessary to remove contaminations such as dust, dirty water, water such as rainwater from the surface of the coating. Hence, the pretreatment step 3 is conducted before the strippable paint is applied to form the protective film for the coating of the automobile.

In the pretreatment step 3, the sprayed coating surface is cleaned with clean water to remove contaminations such as dust, dirty water, and rainwater. This is designated washing step 1. In this washing step, a shower washer is used to prevent the surface of the coating from being scratched. In the washing step, room-temperature water normally is used. However, in cold-weather conditions, warm water is preferably used.

The automobile which has undergone the washing step 1 described above is transported by an appropriate conveying machine 10 such as a conventional hand truck or conveyor to the next station where a dehydrating step 2 is carried out. In the washing step 1, the surface of the sprayed coating of the automobile is wetted with water, which is required to be removed. In the dehydrating step 2, air is blown against the wetted surface of the coating of the automobile to remove the moisture from the surface of the body. In cold seasons, hot air is preferably used as the blown air, for the following reason. Where warm water is employed in the previous washing step 1, the air blowing step is effected, using hot air, in conformity with the warm water to maintain the surface of the coating of the automobile when sent to the next step at an appropriate temperature. The optimum temperature of the surface of the coating having undergone the washing step 1 and the dehydrating step 2 is 10 to 25° C.

In the case of an automobile having a displacement of the order of 2000 cc, if the temperature of the ambient surrounding the surface of the coating is −5° C., and if warm water of 40° C. is sprayed against the surface of the coating at a rate of 1.51/min, then a surface temperature of 18° C.±2° C. is obtained in 15 seconds.

In the pretreatment step 3 consisting of the washing step 1 and the dehydrating step 2 described thus far, when the automobile is kept in stock before being shipped, contaminations adhering to the surface of the coating of the automobile such as dust, dirty water, and rainwater are washed away. As a result, before the strippable paint is applied to form the protective film, the applied surface is cleaned with certainty. Therefore, the paint can be appropriately, reliably, and smoothly applied, and the protective film is effectively formed on the surface of the coating.

The second preferred embodiment of the invention, which is a method of forming a protective film on the surface of the sprayed coating of a product, is next described. The automobile which has undergone the pretreatment step 3 described above has its coating surface cleaned. The automobile is then conveyed by the conveying machine 10 to the next station where an application step is carried out to apply the strippable paint for forming the protective film. The application step, indicated by 6, is conducted inside an application booth 4 which is similar in structure to a paint application booth normally used. However, because a water-soluble strippable paint is preferably used, it is necessary to give considerations to the temperature and moisture inside the booth.

Where a water-soluble strippable paint is used, it is desired that the temperature and the moisture inside the booth be in ranges of 10–25° C. and 50–80%, respectively. As an example, Lapguard prepared by Kansai Paint Co., Ltd., Japan, was used as the water-soluble strippable paint, and it was applied inside the application booth 4 under the above described temperature and moisture conditions.

Where the above-described water-soluble strippable paint is used, the protective film might not be appropriately formed from the paint if the temperature and the moisture are outside the above-described ranges. Any desired means can be employed to apply the strippable paint. For example, a brush, a roller, or a spray gun may be used.

After the strippable paint has been applied inside the application booth 4 in this way, the automobile is conveyed to a next station where a drying step, indicated by 9, is carried out. Prior to this conveyance, the automobile is moved into a setting booth 5. In the present example, the automobile is passed through the setting booth 5 between the application step 6 and the drying step 9. Normally, the temperature of the ambient inside the setting booth 5 is 15 to 30° C., and the humidity is 50 to 80%. In this setting booth 5, the automobile is allowed to stand for a long time after the application of the strippable paint before the drying step to cause the formed film to stabilize. The subsequent drying step 9 consists of preliminary drying and non-preliminary drying.

After the automobile to which the strippable paint has been applied has been moved out of the setting booth 5, the automobile is conveyed into a preliminary drying booth 7 to perform a preliminary drying step.

An infrared drying furnace is used as a heat source in the preliminary drying furnace 7 to promote the drying of the protective film from the inside thereof, the protective film being formed on the surface of the coating. Preferably, the water-soluble strippable paint is illuminated with infrared radiation having wavelengths of 2 to 4 μm for 30 to 60 seconds. If the drying process is initiated from the outer surface of the protective film, holes or cracks will be formed in the surface of the protective film because of solvent or water emerging from inside thereof, thus deteriorating the performance of the protective film. Hence, the drying is preferably accelerated from inside the protective film according to the invention using an infrared drying furnace.

After the automobile is preliminary dried in the preliminary drying furnace 7 as described above, the automobile is conveyed by the conveying machine 10 into a rear-stage, non-preliminary drying furnace 8 where the automobile is dried in a non-preliminary manner. A hot air drying furnace is preferably used as the non-preliminary drying furnace 8 because it is possible to uniformly heat the object to which the paint should be applied. With respect to the temperature conditions under which the hot air drying process is carried out, the automobile to which the present invention is applied is a finished automobile incorporating various electrical appliances and other accessories that are vulnerable to heat. Therefore, in order to protect these appliances and accessories; the drying temperature is preferably in the range from 60 to 90° C. If a drying process is carried out within this range, the electrical appliances and accessories can be prevented from being deteriorated in quality and characteristic.

The layout of the application booth used for the application step and the drying step for the applying the strippable paint and forming the protective film, and the preliminary and non-preliminary drying furnaces used for the drying step, form the third embodiment of the invention.

Where the protective film is formed by the application of the strippable paint as described above, the application and drying of the paint can be continuously, appropriately, reliably, smoothly, and efficiently conducted. Furthermore, the protective film can be formed uniformly according to the invention. Particularly, when the water-soluble strippable paint is dried, the preliminary drying furnace for effecting the preliminary drying step is effected by irradiation of infrared radiation. In consequence, a uniform protective film having desired thickness and having neither holes nor cracks can be obtained.

Figure 6:
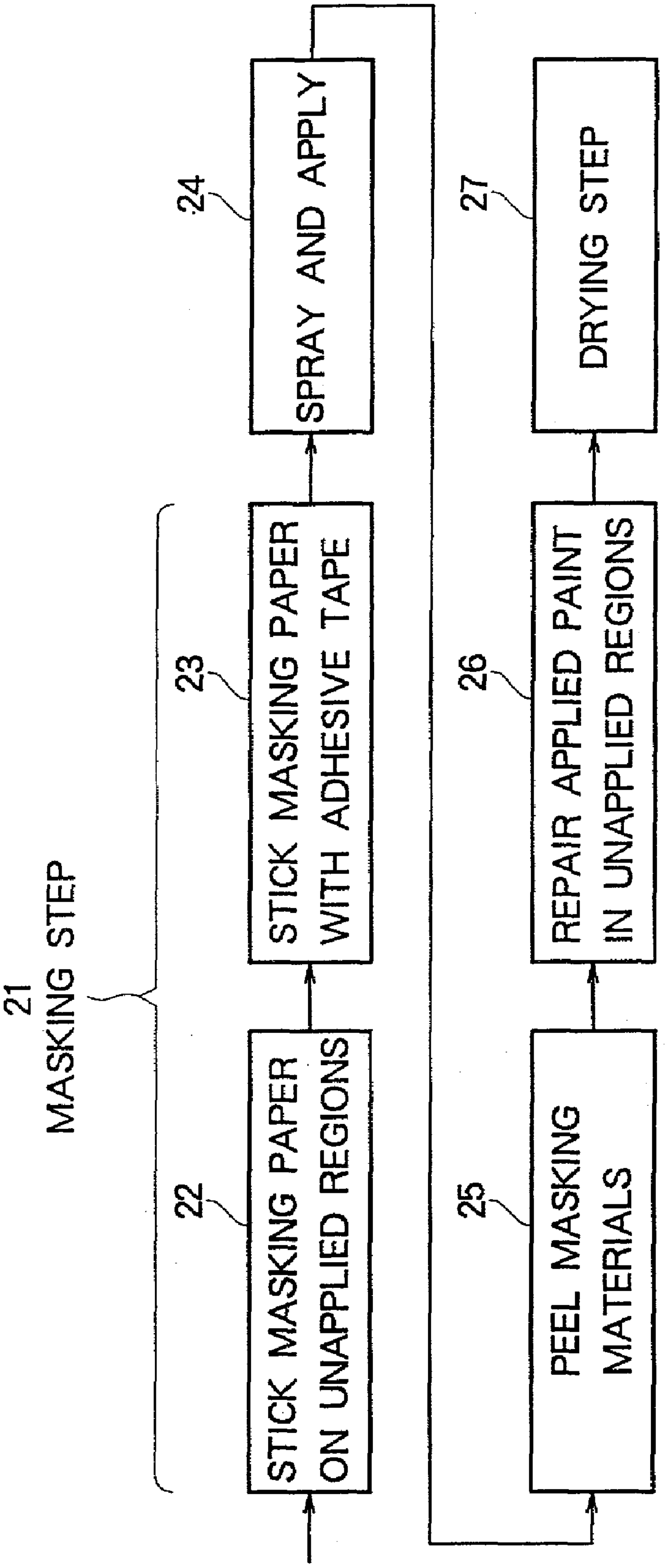
FIG. 6 is a block diagram illustrating successive steps of a method of forming a protective film where the sprayed coating surface contains regions on which the protective film is not required to be formed, such as illustrated in FIGS. 2–5.

The fourth embodiment of the present invention is now described by referring to FIGS. 2–6. FIG. 6 is a block diagram illustrating the successive steps of this embodiment.

Figure 2:
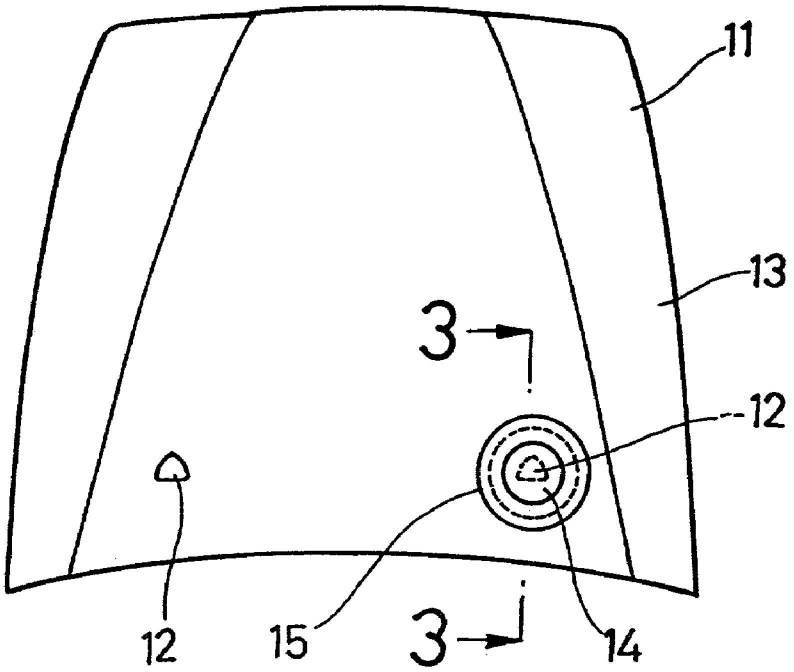
FIG. 2 is a plan view illustrating a method consisting of masking windshield washer nozzles and spraying a strippable paint according to the invention.
Figure 3:
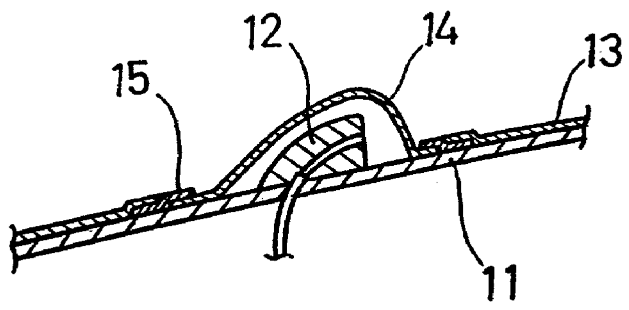
FIG. 3 is an enlarged cross section taken on line 3—3 of FIG. 2.

Shown in FIG. 2 is a hood 11 forming an example of an outer sprayed coating surface of an automobile. Two windshield washer nozzles 12 are formed on opposite sides of the center of the hood 11 to spray cleaning liquid against the windshield, for cleaning it.

Where a protective film is formed by spraying a strippable paint 13 on the hood 11, the following steps are carried out. First, a masking step 21 is conducted. That is, masking paper 14 is stuck on a region which is somewhat wider than each washer nozzle 12 existing inside the region i.e., the hood surface, to which the strippable paint 13 is to be applied. Thus, the nozzle is covered. In FIG. 2, the masking paper 14 is shown to be stuck on the region around the right one of the washer nozzles 12 using pressure sentitive adhesive tape 15; the left one is shown as it is to show one nozzle clearly. Then, a spraying-and-applying step 24 is effected, i.e., the strippable paint 13 is sprayed to apply the paint 13 to the coating surface of the hood 11. Thereafter, the masking paper 14 and pressure-sensitive adhesive tape 15 are removed. This is referred to as the peeling step 25. Finally, a repairing application step 26 is carried out. That is, the strippable paint 13 is applied to the surroundings of the washer nozzle 12 so as to repair the film. Subsequently, the repaired portion is subjected to a drying step 27.

In the masking step 21, a step 22 consisting of covering the washer nozzle 12 with a circular piece of masking paper 14, as illustrated in FIG. 2, is first performed. Then, the annular pressure-sensitive adhesive tape 15 is stuck on the coating surface the hood 11 around the masking paper 14 (step 23). Conventional masking paper and pressure-sensitive adhesive tape may be employed as the masking paper 14 and the pressure-sensitive adhesive tape 15, respectively. A commercially available masking roll paper can be used as the masking paper 14. A pressure-sensitive adhesive tape manufactured by Nichiban Co., Ltd, Japan, is used as the adhesive tape 15.

In the next spraying-and-applying step 24, the strippable paint 13 is sprayed against the whole hood 11 including the masking paper 14 and the pressure-sensitive adhesive tape 15. The paint 13 is so sprayed that a desired protective film is formed on the surface of the hood 11 which is a coating surface. The method of spraying the paint may be either air spray or airless spray. The method may be selected according to the viscosity of the strippable paint 13.

In the peeling step 25, the masking paper 14 and the pressure-sensitive adhesive tape 15 on and around the washer nozzle 12 are peeled off.

Then, the repairing application step 26 is performed. In particular, after peeling off the masking paper 14 and the pressure-sensitive adhesive tape 15, the strippable paint 13 is applied to the unapplied region appearing around the nozzle 12, using a brush.

After completing these steps, the drying step 27 is carried out by air drying or forced drying to form a protective film around the masked portion.

Figure 4:
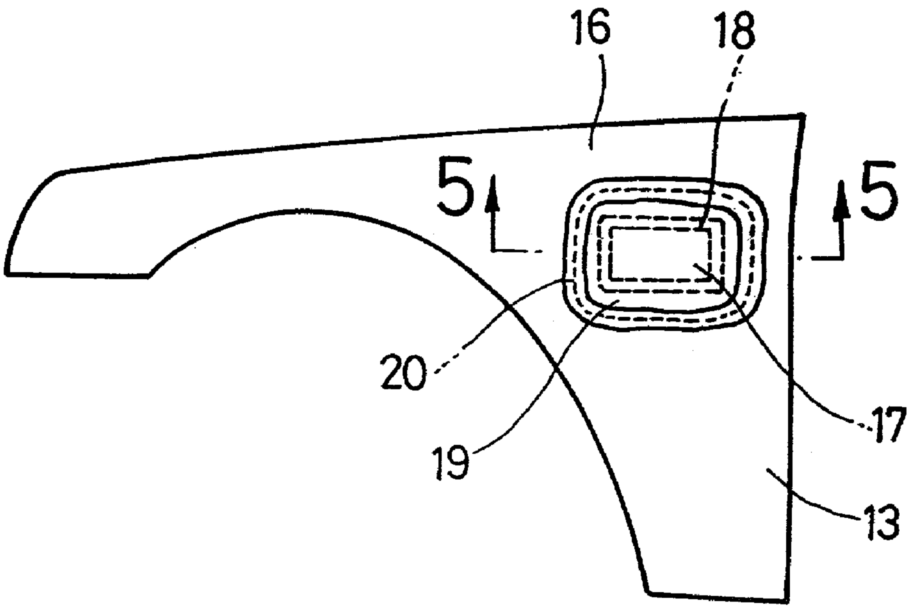
FIG. 4 is a side elevation illustrating a method consisting of masking turning lights mounted at front fenders and spraying a strippable paint according to the invention.
Figure 5:
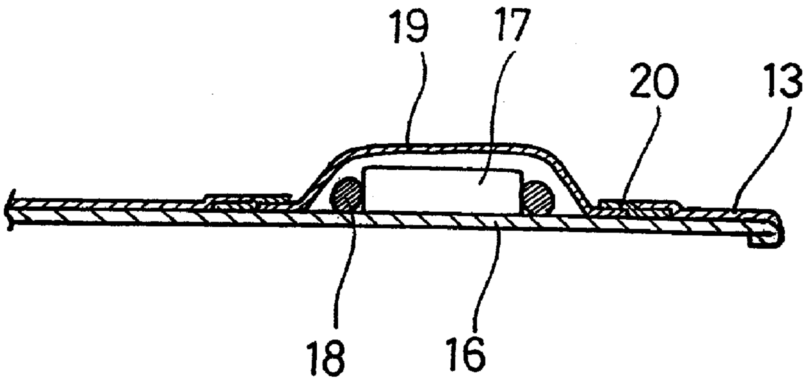
FIG. 5 is an enlarged cross section taken on line 5—5 of FIG. 4.

As shown in FIG. 4, a side turning light 17 for indicating the direction of movement of the automobile is mounted on the front fender 16 together with rubber seal 18, the fender 16 forming an outer sprayed coating surface of the automobile.

Where the strippable paint 13 is sprayed on the front fender 16, a protective film is formed in the same way as in the above-described process. That is, the paint is applied by carrying out the masking step 21 for masking the unapplied region, the spraying-and-applying step 24, the masking peeling step 25, the repairing application step 26, and the drying step 27.

Also in this example, the strippable paint 13 is sprayed after desired portions are masked in the same way as in the case of the hood. More specifically, masking paper 19 is stuck on a region that is somewhat wider than the side turning light 17 located inside the region to which the paint 13 is to be applied so as to cover to cover the turning light 17. The fringes of the masking paper 19 are fixed with pressure-sensitive adhesive tape 20. Then, the strippable paint 13 is sprayed on the coating surface of the fender 16 including the masking paper 19 and the tape 20. In this way, the paint 13 is applied to the coating surface of the front fender 16. Thereafter, the masking paper 19 and the peripheral adhesive 20 are peeled from the coating surface. The paint 13 is then applied with a brush to the unapplied region located around the side turning light 17. Natural drying or forced drying is selected and carried out in the same way as the foregoing embodiment. A protective film is formed on this portion.

In the present example, the strippable paint is not applied to those portions which are not required to be coated with the protective film of the strippable paint. This makes it unnecessary to perform a cumbersome and complex strippable paint-removing procedure at the destination. Furthermore, when the masking step is carried out, a region somewhat wider than the masked object is masked and, therefore, no parting step is necessary. As a result, the masking work is facilitated.

On automobile assembly lines, rustproofing wax or strippable paint is coated onto the painted surfaces of automobiles after they have been assembled and passed through a finished vehicle inspection step in order to prevent scratching of the painted surfaces of the automobile bodies and the adhesion of dust and the like thereto. The strippable paint is coated onto the painted surfaces as described above.

Conventionally, as mentioned above, because coating of the strippable paint is often carried out in a separate step after the finished vehicle inspection step, there have been the following kinds of problems:

In order to prevent the adhesion of dust and dirt to the automobile body and to prevent scratching thereof in the assembly steps after painting of the automobile body, an anti-scratching cover is necessary, and steps of fitting and removing this anti-scratching cover relative to the vehicle body are necessary. As a result, equipment and manufacturing steps for both scratch-prevention and strippable paint coating are required. Consequently, because a lot of equipment and numerous manufacturing steps are required and the equipment and manufacturing steps are discontinuous, an independent, separate coating equipment space is necessary in the conventional method, so that this method is disadvantageous from the space-efficiency viewpoint. Also, strippable paint coating equipment and a coating step completely separate from the steps and equipment which were continuous up to the finished vehicle inspection step are necessary and in some cases a double investment in equipment and manufacturing steps is involved, and consequently the method is disadvantageous from the economic viewpoint also. Furthermore, individual and overall cost increases and increases in man-hours result, and the method is therefore also disadvantageous from the cost reduction and man-hour reduction viewpoints.

Therefore, a strippable paint coating step by which the above-mentioned strippable paint coating can be carried out efficiently in terms of equipment and space and with which scratching of the painted surfaces of the product and the adhesion of dust thereto can be suitably and effectively prevented called for.

According to the present invention a production line satisfying this need can be provided, and preferred embodiments of the invention with which these kinds of problem also can be solved will now be described in detail.

Figure 7:
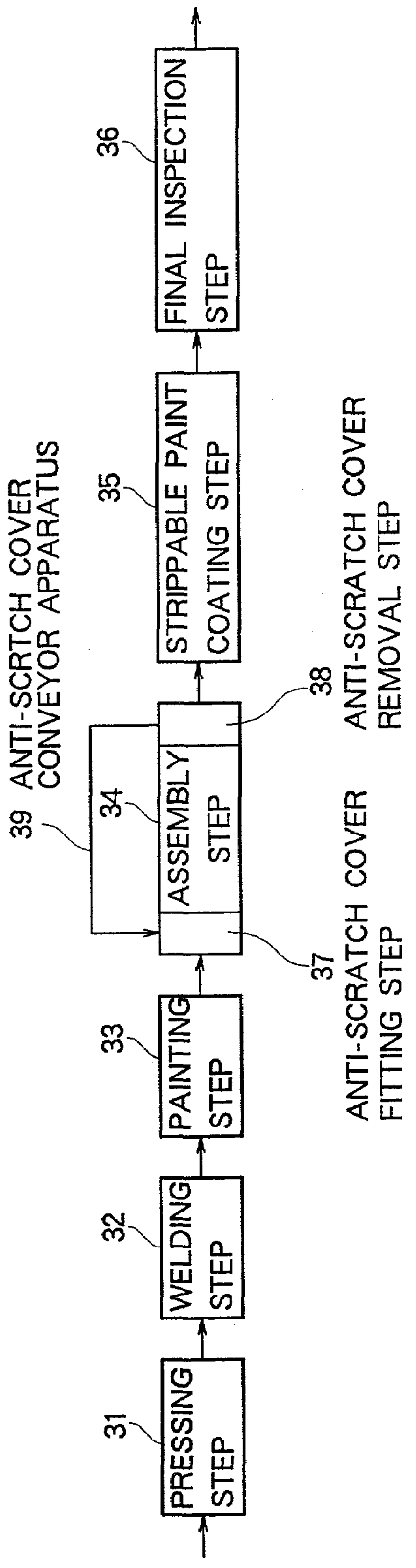
FIG. 7 is a block diagram of an automobile assembly process including a strippable paint coating step.
Figure 8:
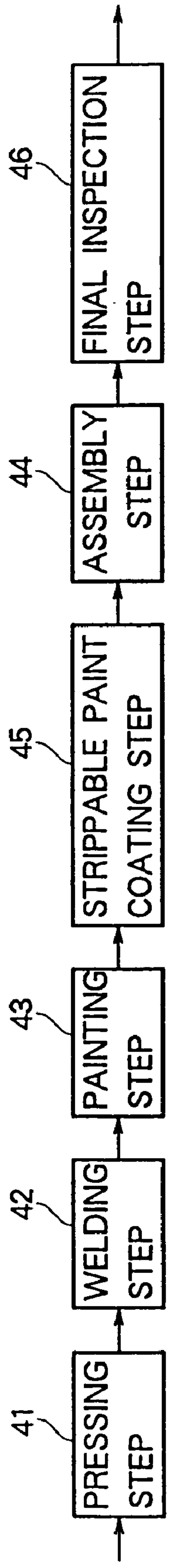
FIG. 8 is a block diagram of another preferred embodiment of an automobile assembly process including a strippable paint coating step.

FIG. 7 and FIG. 8 show in order the manufacturing steps of two such preferred embodiments, respectively.

FIG. 7 is a block diagram showing a first preferred embodiment of an automobile assembly process including a strippable paint coating step. In this preferred embodiment, first, in a pressing step 31, panel parts are formed by plastically working thin sheet steel. The pressed panel parts are then provisionally assembled using jigs or the like and transferred by a conveyor not shown in the drawings to a welding step 32. In the welding step 32 the panel parts are welded together by spot welding or the like to form an automobile body. The surface of this automobile body is painted in a painting step 33 involving a conversion treatment carried out on the automobile body, after which paint is then coated onto the body surface and the painting step 33 thereby completed. Although not shown in the drawings, after painting the automobile ordinarily goes through a drying step and the paint is thereby dried to complete the painting step 33.

After going through the above-mentioned painting step the automobile body is conveyed to an assembly step 34 and an engine and functional parts are fitted thereto. An anti-scratch cover fitting step 37 and an anti-scratch cover removal step 38 are provided before and after the assembly step 34. An anti-scratch cover conveyor apparatus 39 links these steps 37 and 38, and this anti-scratch cover conveyor apparatus 39 conveys covers removed in the anti-scratch cover removal step 38 and returns them to the anti-scratch cover fitting step 37 for reuse.

Finished automobiles assembled in the assembly step 34 are conveyed as they are to the next step which is a strippable paint coating step 35. In this strippable paint coating step 35 a strippable paint which forms a protective film on the painted body surface is coated onto the surface and goes through a drying step as above and a protective film is thereby formed on the body surface. In this way a painted, finished automobile with its painted surfaces protected by a protective film is obtained. This is followed by a finished vehicle inspection step 36 wherein the conformity to specifications of the finished automobile assembled and coated with strippable paint are checked.

According to the above embodiment, because strippable paint coating is carried out immediately after the assembly step is completed, scratching and adhesion of dust and the like occurring between the assembly step and the completed vehicle inspection step can be prevented.

FIG. 8 is a block diagram showing in order the steps of a second preferred embodiment of an automobile assembly process including a strippable paint coating step. This second preferred embodiment of an automobile assembly process including a strippable paint coating step will now be described with reference to FIG. 8. Basically, most of the steps are common with those of the first preferred embodiment of FIG. 7.

In the automobile assembly process shown in FIG. 8, first, in a pressing step 41, panel parts are formed by plastically working thin sheet steel. The pressed panel parts are then provisionally assembled using jigs or the like and transferred by a conveyor not shown in the drawings to a welding step 42. In the welding step 42 the panel parts are welded together by spot welding or the like to form an automobile body. The surface of this automobile body is painted in a painting step 43; involving a conversion treatment after which paint is then coated onto the body surface and the painting step 43 thereby completed. Although not shown in the drawings, after being painted the automobile ordinarily goes through a drying step and the paint is thereby dried to complete the painting step 43.

After the above-mentioned painting step 43 and before the assembly step 44, a strippable paint coating step 45 is interposed. In the strippable paint coating step 45, strippable paint is coated onto the painted surface of the automobile body having passed through the painting step 43. After the strippable paint is coated, it is dried by going through for example infrared drying and/or hot-air drying as above, and a protective film is formed on the painted surface.

After that, as above, the automobile body is conveyed to an assembly step 44 and an engine and functional parts are mounted thereon. In this preferred embodiment, because the strippable paint coating step 45 is interposed after the painting step 43 and before the assembly step 44, the kind of anti-scratch cover fitting and removal steps provided before and after the assembly step in the preferred embodiment of FIG. 7 are unnecessary.

Completed automobiles assembled in the assembly step 44 are conveyed as they are to, the next and final step, the finished vehicle inspection step, and finished vehicle inspections are carried out.

According to this preferred embodiment, together with the effect that it is possible to prevent scratching and the adhesion of dust from occurring between the above-mentioned assembly step and the finished vehicle inspection step, as mentioned above the anti-scratch cover fitting and removal steps provided before and after the assembly step become unnecessary. It is notable in this connection that in the work of assembling the engine and functional parts to the body in the assembly step 44, dust and the like are unavoidable. However, as a result of the automobile bodies going through the strippable paint coating step 45 a strong protective film is formed on the painted surface by the strippable paint coating. Consequently, even if dust or the like occurring in the assembly step alights on the painted surface it is prevented from affecting the painted surface and even if in the assembly step dirt alights on the painted surface of the body it can easily be removed by a subsequent simple wiping-off. With this preferred embodiment, as described above, because anti-scratch cover fitting and removal steps are unnecessary, cost and labor reductions can be achieved.

What is claimed is:

1. In a vehicle manufacturing method involving press-forming panel parts from a sheet metal and welding the panel parts together to form an automobile body, the method comprising the steps of:

painting the automobile body so that the automobile is paint-finished;

assembling an engine and functional parts into the paint-finished automobile body to thereby produce an assembled automobile; and after the automobile is completely manufactured, performing a final inspection of the assembled automobile, wherein the method further includes, between the painting and the assembling steps, pretreating the paint-finished automobile body, including substeps of washing the paint-finished automobile body and dehydrating the paint-finished automobile body;

coating a strippable paint on an exterior painted surface of the paint-finished automobile body;

a step for partially drying said strippable paint applied to the exterior painted surface of the paint-finished automobile body so as to promote the drying of the strippable paint from the inside thereof;

a step for finally drying the automobile body to uniformly dry the entire strippable paint applied to the exterior painted surface of the automobile body to thereby form a protective film on the painted surface; and at least the assembling step and the final inspection step are carried out while the protective film of the strippable paint remains coated on the painted surface of the paint-finished automobile body.

2. The method of claim 1, wherein said partially drying involves use of a first drying means; and said finally drying involves use of a second drying means.

3. The method of claim 2, wherein said step of partially drying said strippable paint uses infrared radiation from said first drying means and said step of finally drying said strippable paint uses hot air from said second drying means.

4. The method of claim 2, further including the step of stabilizing the strippable paint after it is coated on said product and prior to said preliminary drying step.

5. The method of claim 4, wherein said stabilizing step is performed at room temperature.

6. The method of claim 5, wherein said partially and finally drying steps are performed at elevated temperatures.

7. The method of claim 4, wherein said stabilizing step is performed at an ambient temperature of 15–30° C. and an ambient humidity of 50–80%.

8. The method of claim 4, wherein said strippable paint is water soluble and said stabilizing step is performed by allowing the automobile to stand for a sufficiently long time at an ambient temperature of 15–30° C. and an ambient humidity of 50–80% after application of the peelable paint before said preliminary drying step.

9. The method of claim 2, wherein said partially and finally drying steps are performed at elevated temperatures.

10. The method of claim 2, wherein said strippable paint is water based.

11. The method of claim 1, wherein said strippable paint is water based.

12. The method of claim 1, further including the step of shipping the manufactured vehicle after the final inspection step, wherein said shipping is also carried out while the protective film of the strippable paint remains coated on the assembled automobile body.

13. The method of claim 1, wherein said strippable paint coating step involves painting said strippable paint on multiple surfaces of the paint-finished automobile body to thereby form a protective film on the painted surfaces.

14. The method of claim 1, wherein said strippable paint coating step involves painting said strippable paint on all exterior surfaces of the paint-finished automobile body to thereby form a protective film on the painted surfaces.

* * * * *